United States Patent

Mastrogiannis et al.

Patent Number: 6,042,298
Date of Patent: Mar. 28, 2000

[54] MECHANICAL COUPLING ANGLE (PROFILE) JOINT FOR METAL CONCAVE BEAMS

[76] Inventors: Spyros Mastrogiannis, 2 Picusso Street, GR-13400 Kamatero; Athanasios Polyzopoulos, 14 Trapezountos Street, GR-80100 Katerini, both of Greece

[21] Appl. No.: 09/043,319
[22] PCT Filed: Jun. 27, 1997
[86] PCT No.: PCT/GR97/00023
§ 371 Date: Mar. 20, 1998
§ 102(e) Date: Mar. 20, 1998
[87] PCT Pub. No.: WO98/03760
PCT Pub. Date: Jan. 29, 1998

[30] Foreign Application Priority Data

Jul. 23, 1996 [GR] Greece ............... 960100260

[51] Int. Cl.[7] ........................... B25G 3/36
[52] U.S. Cl. ............... 403/402; 403/231; 403/328; 403/297; 74/502.3
[58] Field of Search ................. 403/402, 403, 403/231, 230, 328, 343, 297; 74/502.3, 500.5, 501.5 R; 690/60

[56] References Cited

U.S. PATENT DOCUMENTS 4,669,324  6/1987  DeMey et al. ............ 403/328 X
4,880,219  11/1989  Nemirovsky ............ 74/502.3 X

FOREIGN PATENT DOCUMENTS 2292145  6/1976  France ............... 403/297

*Primary Examiner*—Lynne H. Browne
*Assistant Examiner*—David E. Bochna

[57] ABSTRACT

An angular body secures mitered ends of frame members together. A screw in the body displaces rows of balls to engage respective teeth which can be cammed outwardly and engage in opening of the frame members to draw the frame members tightly against one another.

7 Claims, 7 Drawing Sheets

MECHANICAL COUPLING ANGLE (PROFILE) JOINT FOR METAL CONCAVE BEAMS

CROSS REFERENCE TO RELATED APPLICATIONS

This application is a national stage of PCT/GR97/00023 filed Jun. 27, 1997 and based, in turn, upon Greek national application 96 0100260 filed Jul. 23, 1996 under the International Convention.

FIELD OF THE INVENTION

This invention relates to an angle joint for metal concave beams (profiles).

BACKGROUND OF THE INVENTION

The joint with which the invention is concerned couples fixedly two parts of identical concave beams (profiles) at an angle. Aluminum or iron profiles can be coupled to this joint for producing parallelepipedal items, such as door frames, window frames etc.

Until today, no similar structure has been presented by the manufacturing technology of components for profile angle coupling. The existing technology is limited in using divided coupling angles which are characterized by weak traction and short clamping stretches resulting in failure case the frame move diagonally when handled thus making it ineffective on account of the joint.

The invention as set forth in this description and the drawings eliminates these significant disadvantages through a system which establishes a novel technical rule in the manufacturing technology of angle joints for frames.

The invention provides the following advantages:

1. The main body of the angle joint is uniform and, therefore, stronger.
2. Mechanism with a long clamping course and capability of reclamping.
3. Automatic functioning of the mechanism by clamping a screw without any other procedure.
4. The mechanism allow for the operation of parallel clamping forces with respect to the profiles of the frame, even though the screw moves at a 45° angle on the axis of the profiles' angle.
5. Very fast assembling and increase of productivity.
6. Insection of the angle into the profile cavities without any complication.
7. Automatic alignment of profiles.
8. Powerful clamping and capability of re-clamping due to large clamping tooth stretch of over 5 millimeter.
9. Permanent retaining of profiles from side-shifting.
10. Automatic dismantling of profiles achieved just by loosening a screw.
11. Securing a correct result even with unskilled personnel.

Another object of the invention is to deal with strength, functional and life-duration problems of the invention, accomplishing various structural solutions which will be shown thoroughly in the following detailed description, wherein the already mentioned and further advantages of the present invention will be explained.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
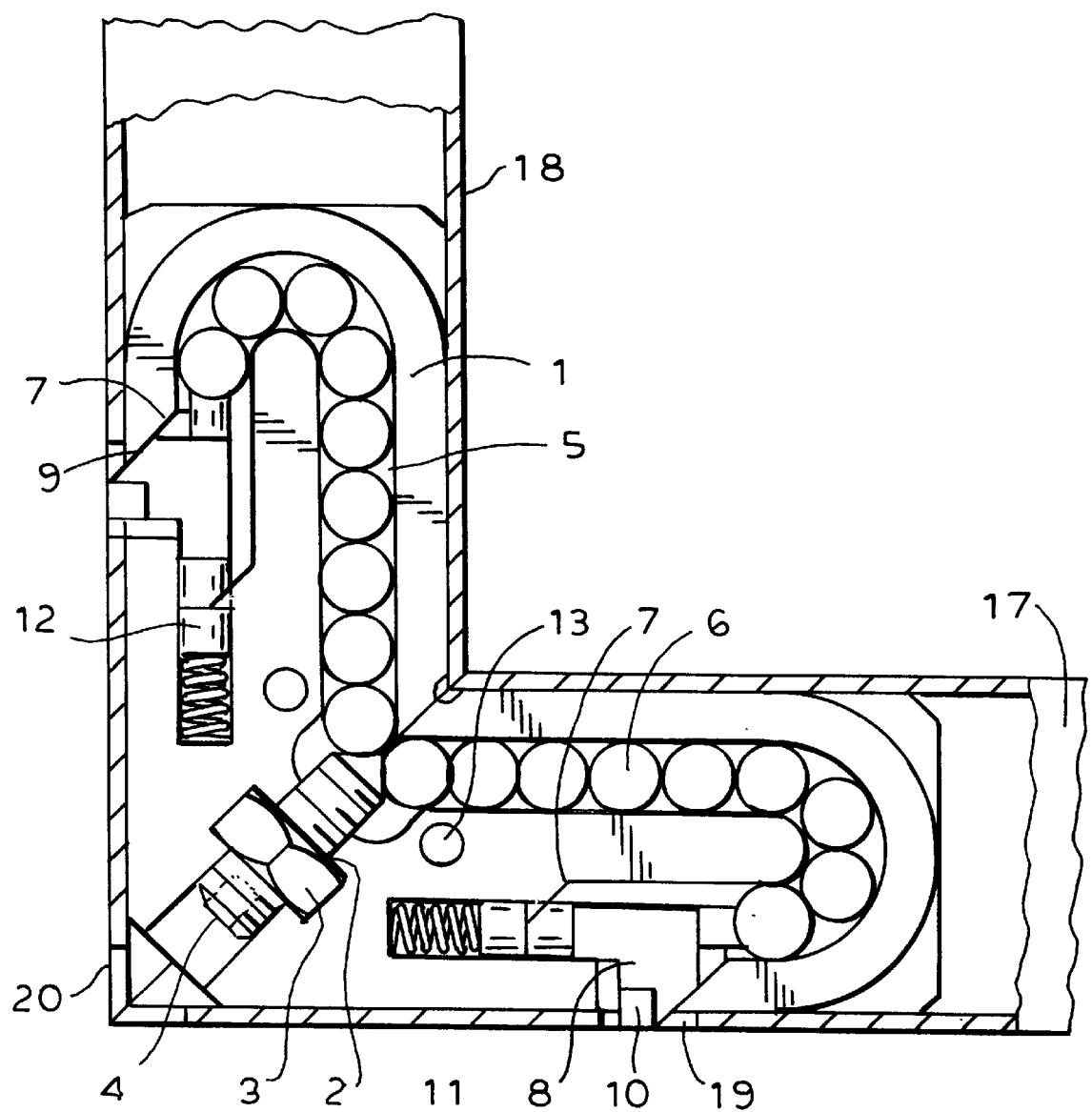
FIG. 1 shows a front sectionional view the interior of the inner side of the main body of the angle joint and the arrangement of the other components.

With reference to a selected typical example of an industrial embodiment of the invention, a numbering of the main parts of the object follows below in respect with corresponding numbering of these parts to the attached drawings, wherein these are represented at a typical descriptive illustration, with no climax, simply according to the size ratio between the parts.

Essentially the mechanical coupling for an angle joint between ends of a pair of hollow frame sections 17, 18, mitered at a 45° angle, comprises an angular body 1 having arms extending into the respective frame sections at the ends which adjoin in the miter. A socket 2 (see FIG. 2 and FIG. 9), is formed in the two portions which form the body 1 when they are joined by the rivets 14 and receives the nut 3 into which a screw is threaded so that the screw extends diagonally in the body at a junction between the arms. Within the body there are respective grooves 5 leading from this junction into the respective arms and opening at the respective arm toward the junction at the end of the groove distal from the screw. A row of balls or pellets 6 is displaceable along each groove to change the direction of the force transmitted to the balls of the screw from a direction away from the screw to a direction toward the screw (see especially FIGS. 1, 6 and 8).

A respective recess is formed in each arm at the distal end of the groove to accommodate a tooth which is spring-loaded by the respective spring 11 via the washer 12. The teeth 8 are cammed outwardly by the respective slanted plane 7 at the groove end when displaced against the force of the spring by the balls and are cammed inwardly by the spring force when the ball force is relieved by the inclined plane 9. The contacting surface of the tooth 8 has a circular ark configuration at 10 for engagement in the respective openings 19 in lateral walls of the frame members. The apertures for receiving the rivets 14 are shown at 13 and the reference numeral 15 has been used to represent the half of the body 1 forming the lid. A recess to receive shavings is shown at 16 and the aperture enabling access to the screw in the frame members has been represented at 20.

Figure 3:
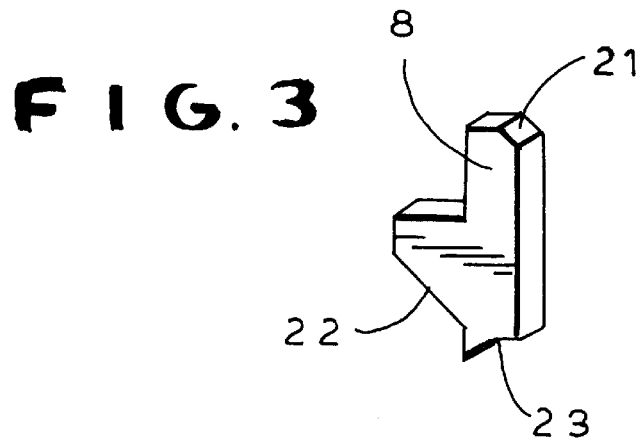
FIG. 3 is a perspective view of the special tooth.
Figure 4:
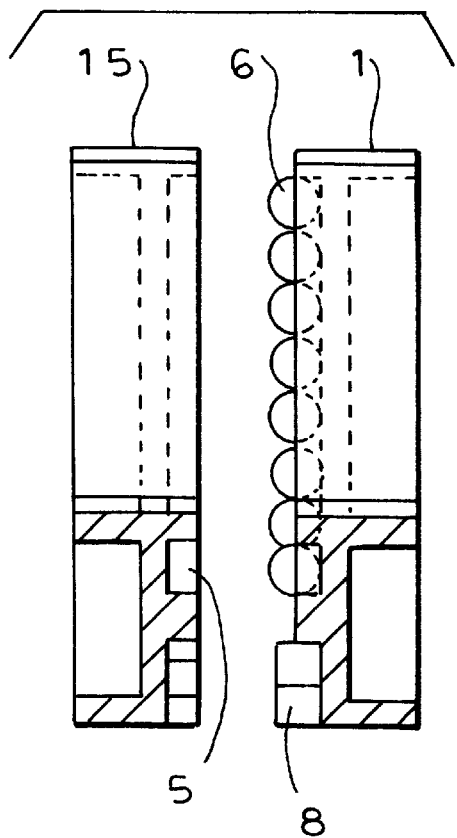
FIG. 4 is a transverse section of the two pieces of the main body of the joint, before the assembly.
Figure 6:
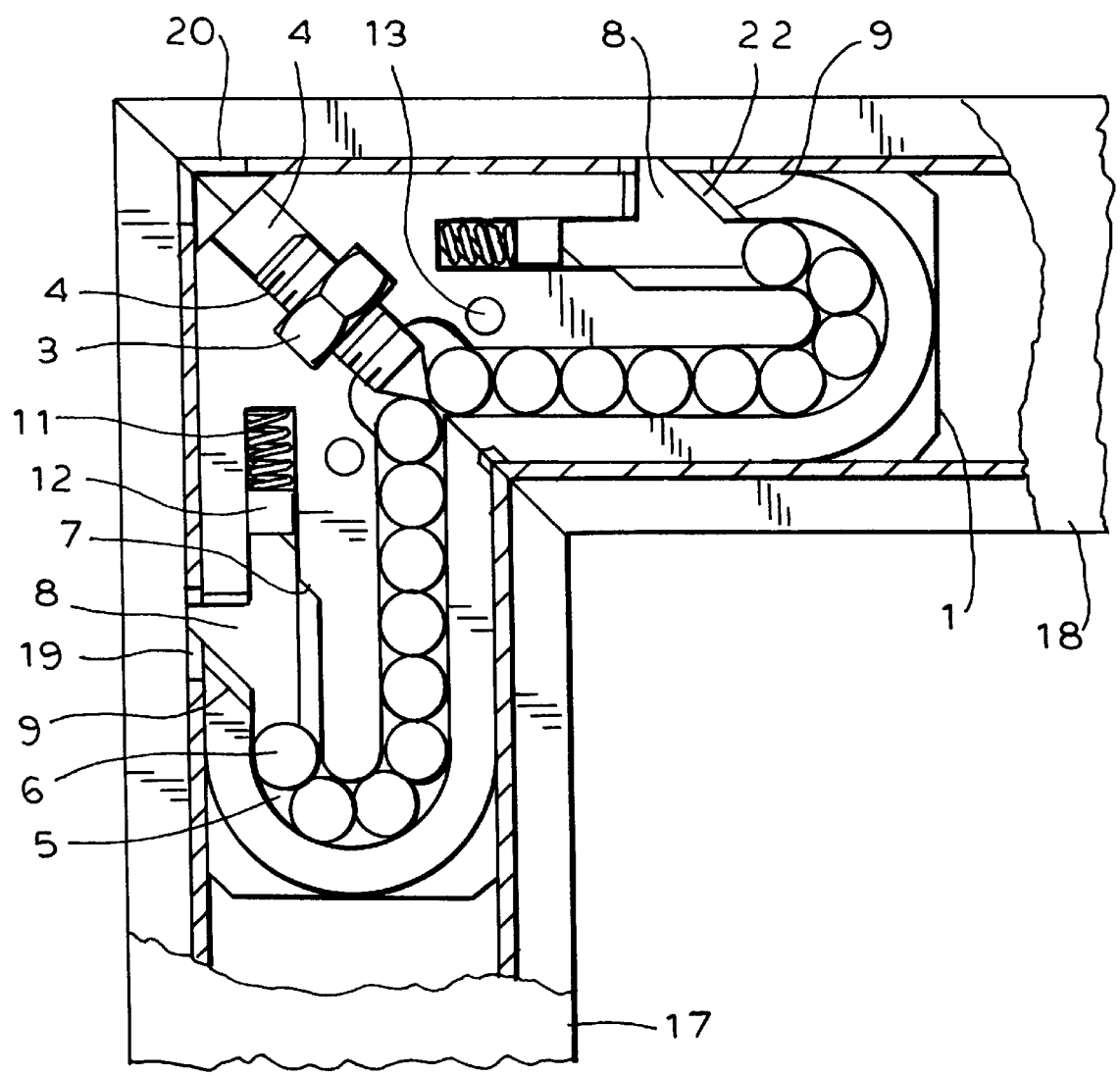
FIG. 6 is a perspective section of the main body set in the angle formed by two hollow beams (profiles).
Figure 7:
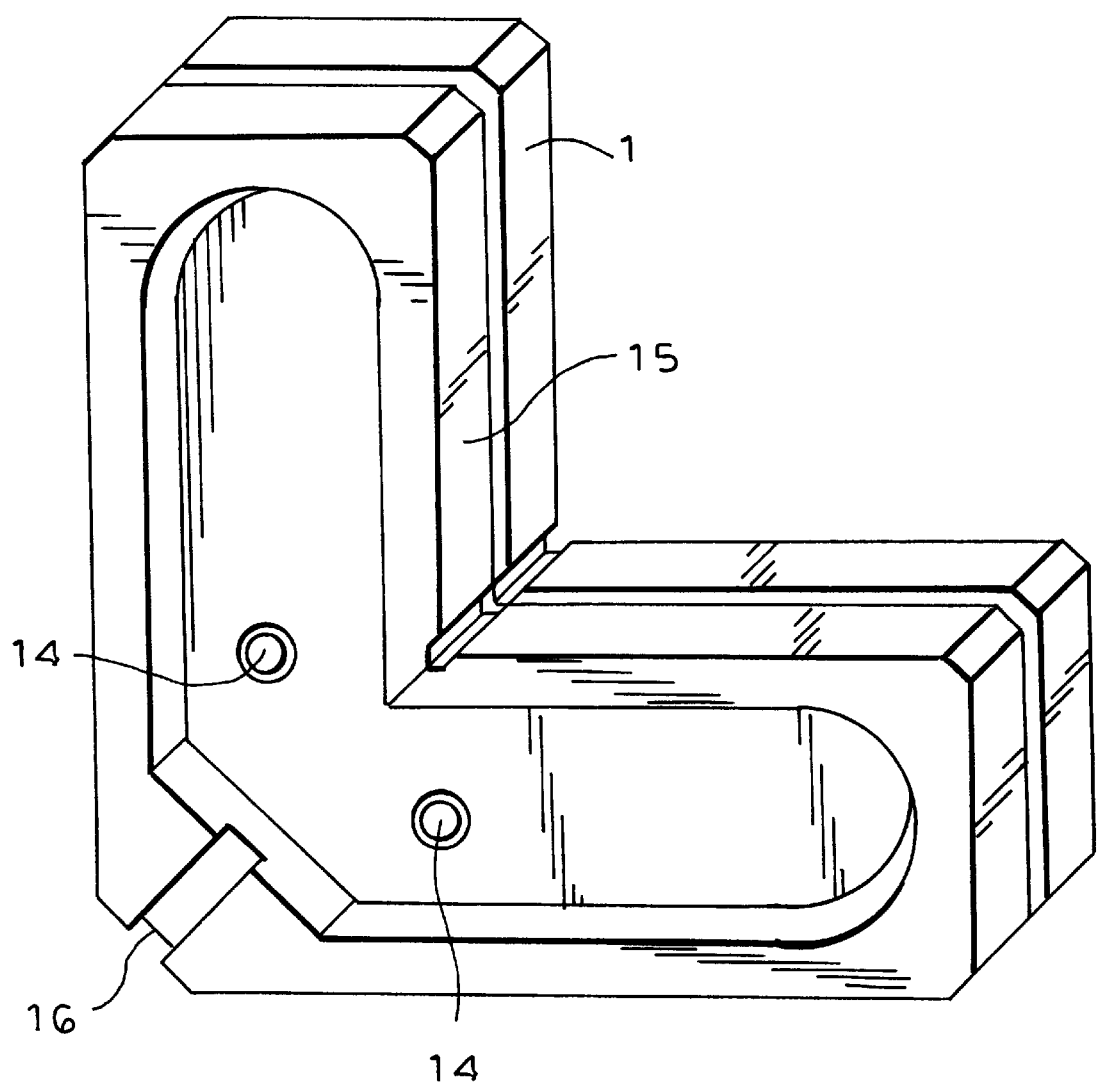
FIG. 7 shows perspectively the external view of the angle joint.
Figure 8:
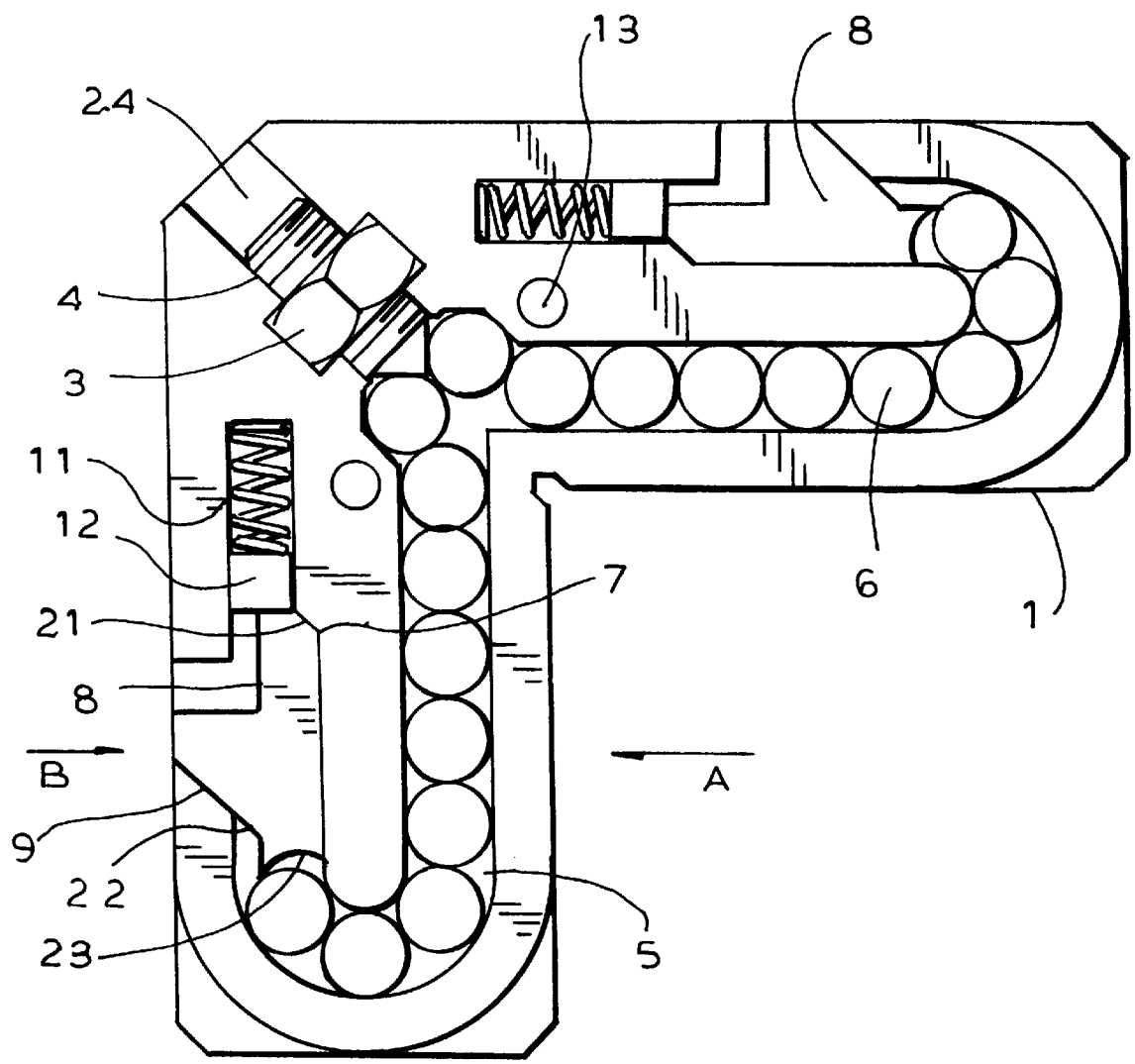
FIG. 8 is a view similar to FIG. 6 but showing the position in which the teeth are biased inwardly by the respective springs upon retraction of the screw.
Figure 9:
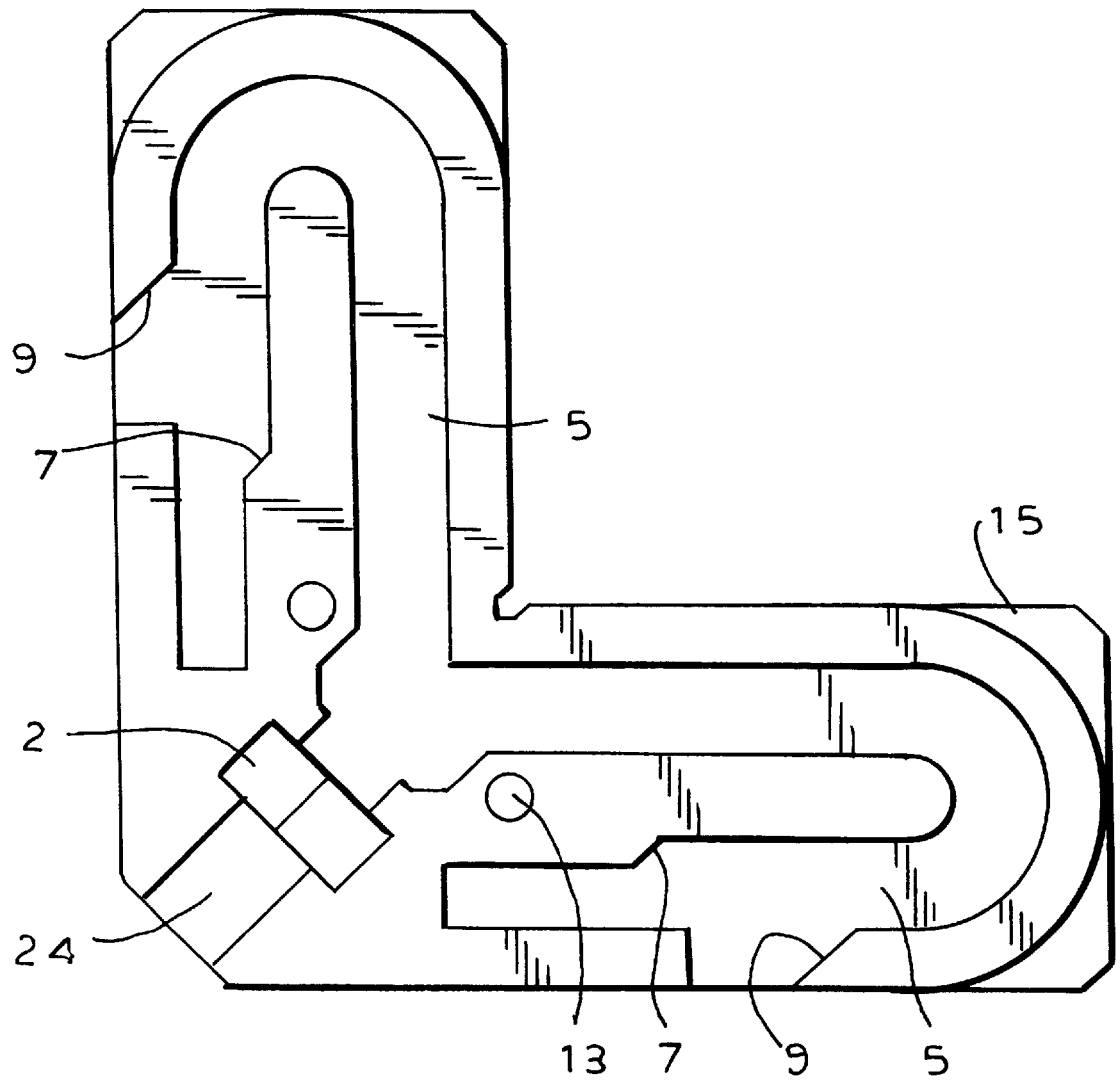
FIG. 9 is a view of the interior of the angular body showing the grooves and recesses and with the teeth, balls and screw removed.

As can be seen from FIGS. 6, 3 and 8, each tooth can have a slanted plane 21 engageable with the respective inclined surface 7, a rear slanted plane 22 engageable with the inclined surface 9 and an arcuate tooth end 23 engageable by the last ball of the respective row. The recess for receiving the screw has been represented generally at 24 and the reference numeral 25 has been used to indicate a rivet tolerance of 1 to 2 mm, i.e. a tolerance allowing the parts 1 and 15 to spread apart by this amount as the screw is tightened to lock the angle joint body into the frame members.

Figure 2:
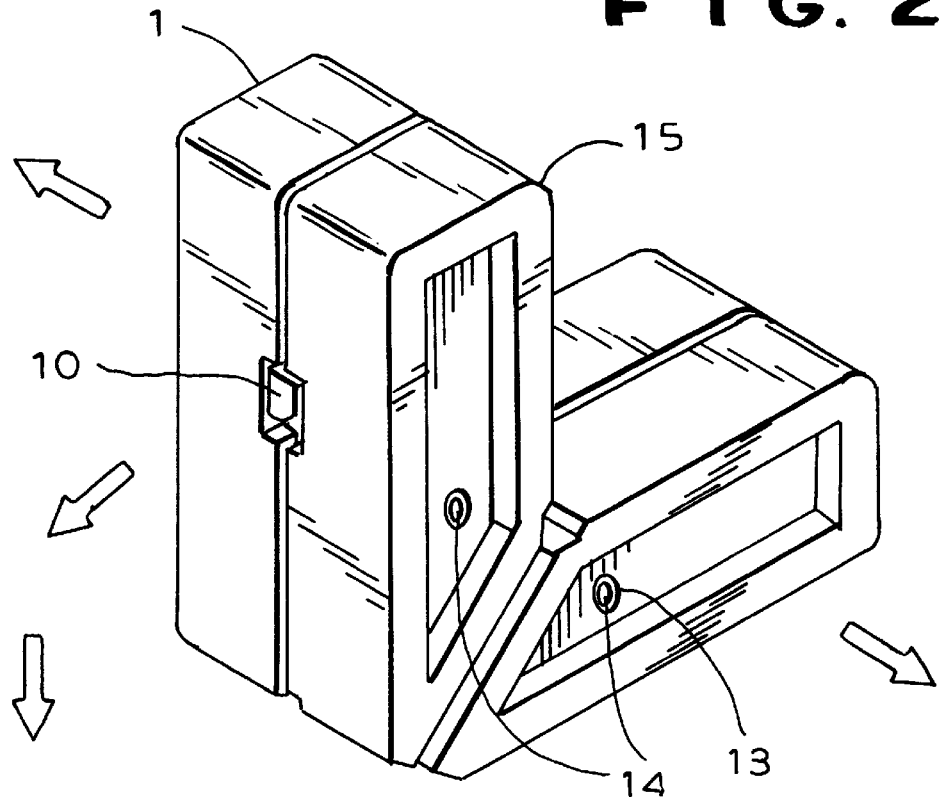
FIG. 2 is a prespective view of the inner side of the main body of the angle joint.

According to the preferred typical embodiment of the invention the angle joint of aluminium frames consists of the main body 1, having a socket 2 for a nut 3 wherein the screw 4 is screwed. The main body 1 has a groove 5 as shown in FIG. 1, wherein pellets 6 are moving. The groove end 5 comes to a slanted plane (7) which coincides with the corresponding slanted plane 21 of the special tooth 8 having a circular contacting surface 10 in respect with the apertures 19 of the profiles 17 and 18.

At the end of tooth (8) and in a corresponding socket of the main body (1), there is a pressure spring (11) with washer (12). On top of the main body (1), the lid (15) is placed, supported by rivets (14).

The angle joint is assembled and operates as follows:

For the assembling of a frame, e.g. a window made of concave, four mechanical coupling angle joints are needed. The ends of the frame profiles are cut at a 45° angle and each end has a lateral aperture (19) and an aperture (20) at the respective miter.

Figure 5:
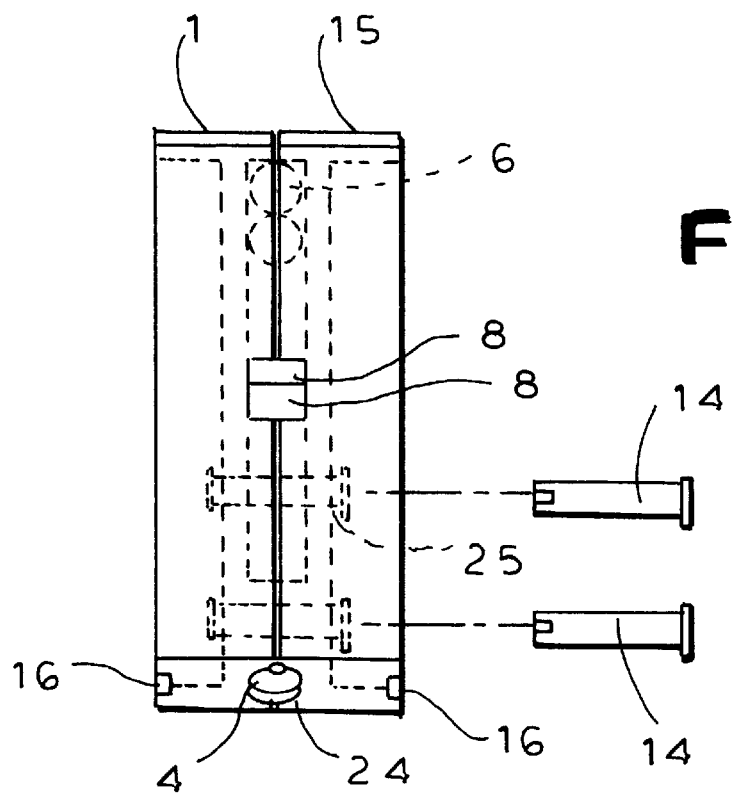
FIG. 5 is an elevational exploded view of the two main body pieces assembled (25) and the rivets.

The mechanical angle joint is placed directly within the inner cavity of the profiles (17) and (18) without any other procedure. With a corresponding key the screw (4) is turned and automatically a perfect and powerful junction of the profiles at the angles of the window frame is achieved. In detail this is achieved as follows: The screw (4) pushes apart simultaneously the two sets of balls or pellets (6), whereas the last pellet of each set presses and pushes the special tooth (8), the slanted plane (21) of which meets the slanted plane (9) of the main body (1) and the lid (15), and is moving diagonally outward contacting the aperture (19) of the profiles (17) and (18). Afterwards the special tooth (8) moves parallel to the profile. During this stage the pellets (6) tend to fold between each other and push the main body (1) as well as the lid (15) from the inside towards the outside, simultaneously pushing the inner sides of the inner cavity of the profiles from the inside towards the outside aligning them completely. The main body (1) and the lid (15) can open in width due to a 1 or 2 millimeter tolerance (25) of the rivets (14) (FIG. 5).

The teeth (8) continue to move, independent from the side opening of the mechanical angle, pushing the profiles (17) and (18) towards the acme of the angle and a perfect, powerful union and assembling of the profiles is achieved, even from not-skilled persons.

In case of dismantling, the screw (4) is turned reversely whereupon the springs (11) push the special teeth (8), which due to the slanted planes (21) and (22) move diagonally and towards the inside, and immediate dismantling of the profiles is achieved.

It must be considered that the object of the invention is not restricted by the above example. The accomplishment of the invention is possible by means of other manufacturing ways, methods, components and mechanisms which are within the scope of the present description.

It must be noted that the present description of the invention has been made with reference to only a few typical examples of embodiment. Thus, any amendment or modification in respect with the shape, form, dimensions, the utilized materials and components for the manufacture and assmbly thereof, must be considered as included within the purposes and the scope of the present invention.

We claim:

1. The combination of a pair of hollow frame sections and a mechanical coupling for an angle joint between ends of said pair of hollow frame sections adjoining at an angle and each having an opening in the respective frame section spaced from the respective end, said mechanical coupling comprising:

an angular body having arms extending into the respective frame sections at said ends;

a screw threaded diagonally into said body at a junction between said arms;

respective grooves formed in said body leading from said junction into the respective arm and terminating at an end of the groove distal from the screw;

a respective recess in said body at the end of the respective groove distal from said screw;

a spring-loaded tooth received in each recess and adapted to project from the respective arm into the respective opening but spring biased out of said opening into the arm; and a row of balls in each of said grooves bearing on the respective tooth and, upon rotation of said screw, camming the tooth out into said opening and drawing said frame sections tightly against one another.

2. The mechanical coupling defined in claim 1 wherein said body is composed of a main body part and a lid fastened to said main body part by rivets with a tolerance enabling said body parts to spread upon tightening of said screw.

3. The mechanical coupling defined in claim 2 wherein said body is composed of two body parts held together by rivets and formed with respective sockets receiving a nut into which said screw is threaded.

4. The mechanical coupling defined in claim 1, further comprising a respective compression spring and a washer bearing against each of said teeth.

5. The mechanical coupling defined in claim 1 wherein each recess has inclined surfaces cooperating with inclined surfaces on the respective tooth for camming the tooth into and out of the respective arm.

6. The mechanical coupling defined in claim 1 wherein each of said teeth has a curved surface engageable with the last ball of the respective row.

7. The mechanical coupling defined in claim 1 wherein said screw has a conical end bearing directly upon the first balls of each of said rows.

* * * * *